(12) United States Patent
Michiels et al.

(10) Patent No.: US 9,213,808 B2
(45) Date of Patent: Dec. 15, 2015

(54) CONTROLLING DISTRIBUTION OF DIGITAL CONTENT

(75) Inventors: Wilhelmus Petrus Adrianus Johannes Michiels, Eindhoven (NL); Paulus Mathias Hubertus Mechtildis Antonius Gorissen, Eindhoven (NL)

(73) Assignee: Irdeto B.V., Hoofddorp (NL)

( * ) Notice: Subject to any disclaimer, the term of this patent is extended or adjusted under 35 U.S.C. 154(b) by 1848 days.

(21) Appl. No.: 12/438,370

(22) PCT Filed: Aug. 16, 2007

(86) PCT No.: PCT/IB2007/053265
§ 371 (c)(1),
(2), (4) Date: Feb. 23, 2009

(87) PCT Pub. No.: WO2008/023307
PCT Pub. Date: Feb. 28, 2008

(65) Prior Publication Data
US 2009/0199305 A1 Aug. 6, 2009

(30) Foreign Application Priority Data
Aug. 21, 2006 (EP) .................................... 06119224

(51) Int. Cl.
*G06F 21/10* (2013.01)
*G06F 21/12* (2013.01)

(52) U.S. Cl.
CPC .............. *G06F 21/10* (2013.01); *G06F 21/125* (2013.01); *G06F 2221/2137* (2013.01)

(58) Field of Classification Search
None
See application file for complete search history.

(56) References Cited

U.S. PATENT DOCUMENTS

| 5,982,891 A | 11/1999 | Ginter et al. |
| 8,166,471 B2 * | 4/2012 | Graunke ........................ 717/170 |
| 2004/0034602 A1 * | 2/2004 | Rubin et al. ..................... 705/57 |
| 2004/0083384 A1 | 4/2004 | Hypponen |
| 2005/0187936 A1 | 8/2005 | Homer |
| 2005/0246285 A1 | 11/2005 | Chakravarthy et al. |
| 2005/0262347 A1 | 11/2005 | Sato et al. |
| 2007/0073623 A1 * | 3/2007 | Phelps ............................ 705/51 |

(Continued)

FOREIGN PATENT DOCUMENTS

| JP | 9212357 A | 8/1997 |
| JP | 2002-258961 A | 9/2002 |

(Continued)

OTHER PUBLICATIONS

"Japanese Application Serial No. 2009-525143, Office Action mailed Jul. 31, 2012", (w/ English Translation), 11 pgs.

*Primary Examiner* — Jamie Kucab
(74) *Attorney, Agent, or Firm* — Marc S. Kaufman; Reed Smith LLP

(57) ABSTRACT

A method of controlling distribution of digital content (116) is presented. A version (106) of a program (100) is needed to use the content. A plurality of versions of the program (100) is generated, each version being unique with respect to incorporated code fragments and/or associated locations thereof. The plurality of respective code fragments (118) each cause a processor to perform a respective test regarding a data characteristic on content to be processed by the program for restricting the processing of content for which the permission has not been granted. The respective code fragments (118) are incorporated at respective locations in the program (100) to obtain the version (106) of the program (100).

12 Claims, 2 Drawing Sheets

(56) References Cited

U.S. PATENT DOCUMENTS

2009/0288174 A1* 11/2009 Wilson et al. .................. 726/30
2011/0214188 A1* 9/2011 Collberg et al. ............... 726/26

FOREIGN PATENT DOCUMENTS

| JP | 2004-362532 A | 12/2004 |
| WO | 2006085103 A1 | 8/2006 |

* cited by examiner

CONTROLLING DISTRIBUTION OF DIGITAL CONTENT

FIELD OF THE INVENTION

The invention relates to controlling distribution of digital content.

BACKGROUND OF THE INVENTION

The Internet provides users with convenient and ubiquitous access to digital content. Because of the potential of the Internet as a powerful distribution channel, many consumer electronics (CE) products strive to directly access the Internet or to interoperate with the PC platform—the predominant portal to the Internet. The CE products include, but are not limited to, digital set top boxes, digital TVs, game consoles, PCs and, increasingly, hand-held devices such as PDAs, mobile phones, and mobile storage and rendering devices, such as Apple's iPod. The use of the Internet as a distribution medium for copyrighted content creates the compelling challenge to secure the interests of the content provider. In particular it is required to warrant the copyrights and business models of the content providers. Increasingly, CE platforms are operated using a processor loaded with suitable software. Such software may include the main part of functionality for rendering (playback) of digital content, such as audio and/or video. Control of the playback software is one way to enforce the interests of the content owner including the terms and conditions under which the content may be used. Where traditionally many CE platforms (with the exception of a PC and PDA) used to be closed, nowadays more and more platforms at least partially are open. In particular for the PC platform, some users may be assumed to have complete control over the hardware and software that provides access to the content and a large amount of time and resources to attack and bypass any content protection mechanisms. As a consequence, content providers must deliver content to legitimate users across a hostile network to a community where not all users or devices can be trusted.

One way to protect copyrighted data is to encrypt it or to encode it in a proprietary format such that the content can only be used with a proprietary program. The proprietary program contains code to enforce a digital rights management policy. If a user is allowed to access the data, then he/she may be allowed access to a key via the proprietary program for decrypting or decoding it.

SUMMARY OF THE INVENTION

It would be advantageous to have an improved method of controlling distribution of digital content. To better address this concern, in a first aspect of the invention a method is presented wherein a version (106) of a program (100) is needed to use the content, comprising generating a plurality of versions of the program (100), each version being unique with respect to incorporated code fragments and/or associated locations thereof, by for each version (106), identifying one or more data characteristics of a content item for which a permission has been granted, determining a plurality of respective code fragments (118) each causing a processor to perform a respective test regarding at least one of the data characteristics on content to be processed by the program for restricting the processing of content for which the permission has not been granted; associating each respective code fragment (118) with a respective location in the program; and incorporating the respective code fragments (118) into the program (100) at the respective associated locations to obtain the version (106) of the program (100).

The distribution is controlled because a content item can only be used with designated version(s) of the program. The generating of the version of the program may be performed for example by the content provider. It is also possible to freely distribute a 'basic' program with restrictions for many content items, and to generate the versions of the program by supplying appropriate upgrades to the program.

Since each version of the program has reduced functionality when applied to the content for which the permission has not been granted, the distribution is controlled in the sense that only privileged users having the right version for a particular content item can use the content item to its full potential. When a first user would forward content to a second, unprivileged, user, that second user would not be able to make full use of the forwarded content because his or her version of the program has reduced functionality for that content. Using the content may comprise rendering the content and/or processing the content. The content may comprise audio and/or video data and/or interactive or non-interactive multimedia content (e.g. HTML, JavaScript). The content may also be encrypted, in which case using the content may comprise decrypting the content. Restrictions of the processing of the content may include a restriction to see only a portion of an item, to see the item only once or for a limited time duration, restrictions in viewing and/or storing the content item, and restrictions in audio and/or video quality (e.g. high definition (HDTV) versus low definition (PAL)) of the rendering.

If the outcome of the test performed by a code fragment corresponds to content the user it not privileged to use, then the code fragment may cause a change of a flow of execution of the program for example using an abort instruction or an instruction to switch to a mode with a reduced functionality.

The smaller the number of users that share an identical user specific version of the program, the better the control of the distribution will be. For example by providing at most 1% or 10% of the users with an identical version, a pirate will have a probability of at most 1% or 10%, respectively, that a user who is potentially interested to buy the content from the pirate will be able to use the content obtained from the pirate. A relatively great degree of control is achieved by providing each user with a unique version of the program. The incorporated code fragments may be chosen from one of a variety of possible ways, for example the contents of the code fragments may differ, code fragments may be inserted at differing places in the program, the order of the code fragments in the program may differ, and/or code fragments may test differing aspects of the content. The reduction in functionality may comprise refusing a use of the content. It may also comprise rendering a warning message, limiting the amount of the content that may be used, and/or imposing a limitation on interactive possibilities of the content.

Because only privileged users may use the content, the content may be distributed freely to each of the plurality of users. However, it is also possible to provide each user only with the content he is allowed to use.

Because each version of the program is unique with respect to the incorporated code fragments and/or associated locations thereof, illegal copies of the program can be traced to an owner of the unique version of the program.

An aspect of the invention comprises, upon the permission being granted/withdrawn for a particular content item, generating an upgrade for applying a change to at least one code fragment of the plurality of code fragments and/or its associated location, to avoid/to cause the processing of the particular content item to be restricted.

Because the upgrade only changes the code fragments incorporated into one particular version of the program, it may be impossible to apply the upgrade successfully to another version of the program. This improves the control of the distribution because when a user forwards the content and the upgrade to a second user who does not have the privilege to use the content, the second user still cannot use the content, as the upgrade does not function properly when applied to the second user's version of the program.

An aspect of the invention comprises identifying one or more data characteristics of a particular content item for which a partial permission has been granted; and determining the plurality of respective code fragments (118) such that the processing of the particular content item is restricted according to the partial permission. This improves the flexibility of permissions that can be granted.

An aspect of the invention comprises, upon the partial permission being changed, generating an upgrade for applying a change to at least one code fragment of the plurality of code fragments and/or its associated location, to cause the restriction on the processing of the particular content item to be changed according to the change in the permission. This improves the flexibility of changing permissions.

An aspect of the invention comprises, for the version (106) of the program (100) granting the permission to a user associated with the version; and providing the version of the program only to the user associated with the version.

For example, first the permission is granted to the user, then the user is associated with a version of the program, then the version is generated according to the permissions, and then the program is provided to the user. Making the versions user specific increases the level of controllability of the content distribution. The lower the number of users having an identical version of the program, the more difficult it is for a pirate to distribute content.

An aspect of the invention comprises for the version (106) of the program (100) granting the permission to a user associated with the version; and providing the content item for which a permission has been granted to the user.

For example, first the permission is granted to the user, then the user is associated with a version of the program, then the version is generated according to the permissions. The content can be provided to the user at any desired time. Content items can even be provided if no permission has been given, since the items can only be used after an appropriate version or upgrade has been provided. It is convenient to provide the user with the content for which he has acquired a license, because the content is needed for a use (e.g. rendering) of the content.

An aspect of the invention comprises including in the upgrade instructions for providing additional functionality or for fixing a bug in the program. Such additional functionality or bug fixes are conveniently combined with the permissions upgrade. It may be more economic or efficient to combine such upgrades in a single upgrade.

An aspect of the invention comprises arranging the version of the program to have an input for reading a reference value; and arranging at least one code fragment of the plurality of code fragments for causing a processor to compare a value derived from the content to the reference value as part of the test.

Such a derived value is especially efficient to be used as a data characteristic. The value derived from the content is for example a checksum, hash value, or a result of a cryptographic operation. The reference value is for example a predetermined outcome of the derived value for the allowed content. The reference value may also be a value that does not correspond to any content that the user is privileged to use. In this case, if a piece of content is to be processed of which the derived value equals the reference value, it is found that there is no permission. There may be a large number of code fragments included in the user specific version of the program, each comparing the derived value to one or more or a range of predefined values. The code fragments may be different for different versions of the program, such that different reference values are needed for different versions of the program for the same content item. The reference value may be stored in a separate file or in the registry of the computer running the version of the program. It may also be provided on demand via an external server. It may also be comprised in the program code. As there is a plurality of incorporated code fragments in a single version of the program, it is possible to arrange more or all of the incorporated code fragments to use the input reference value. It is also possible to have a plurality of inputs for reading a plurality of reference values corresponding to the plurality of code fragments.

An aspect of the invention comprises, upon the user being granted permission for a further content item, identifying a further reference value in dependence on the further content item; and providing the further reference value to the input, thereby causing the processor to compare the value derived from the content to the further reference value as part of the test.

This can be a convenient way to provide additional permissions. As the code fragments incorporated in different versions of the program may differ, the further reference value may not be used by a different version of the program. The further reference value may be provided in the form of a file containing the new reference value(s), or in the form of a program that changes an existing file or changes the registry.

BRIEF DESCRIPTION OF THE DRAWINGS

These and other aspects of the invention will be further elucidated and described with reference to the drawing, in which.

DETAILED DESCRIPTION OF EMBODIMENTS

Companies may lose a lot of money due to piracy of copyrighted data, such as movies, music, and e-books. In piracy one tries to copy data and then distribute it via, for instance, the Internet.

It is common practice to protect copyrighted data by encrypting it. If a user is allowed to access the data, then he/she is provided with the key that is required for decrypting it. However, this hardly protects against piracy. Besides a copy of the encrypted data, one only has to provide an illegal user with this key in order to let him/her access the copyrighted data.

Figure 1:
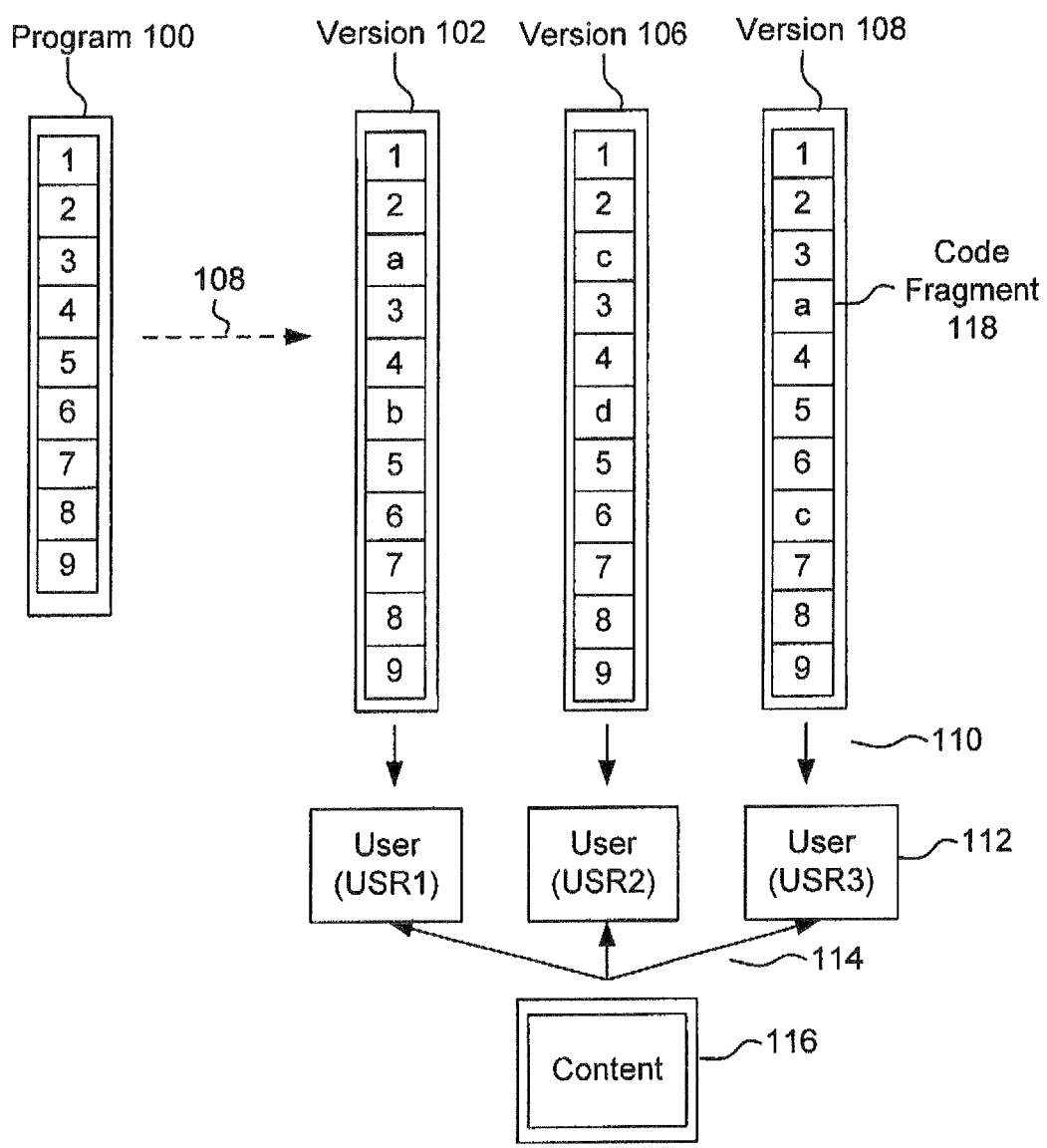
FIG. 1 is a diagram showing a flow of code and content.

FIG. 1 illustrates an embodiment of the invention. The Figure shows a plurality of users (USR1, USR2, USR3). The content is symbolically represented by block 116. The Figure also shows a program 100 to make use of the content. Blocks with numbers 1-9 are used symbolically to represent instructions or blocks of code in the program. The program 100 may for example comprise instructions for causing a processor to decrypt, render, and/or process the content 116. Arrow 108 indicates that a plurality of different versions 102, 104, 106 are derived from the program 100. Letters a-d indicate code fragments incorporated in the original program 100. It may be necessary to make some modifications to the original program blocks numbered 1-9 to accommodate the inserted code fragments. Arrows 110 and 114 indicate how the programs and the content are provided to the users. To each user, privileges are assigned indicative of items of content 116 that the user is allowed to use. For example, a content provider may maintain a database of users containing for each user a list of titles that the user may access and/or a list of titles that the user may not access.

For a user 112, the content provider creates a user specific version 106 of the program 100, by incorporating in the program a plurality of code fragments together reducing the functionality of the program when applied to content that the user is not allowed to use. When the program is applied to content that the user is allowed to use, then the code fragments do not prevent full use of the content. The code fragments may use the data of the content to decide whether the content is to be used. The code fragments may also access a database of permissions to decide this. The plurality of code fragments are chosen such that different users get different versions (102, 104, 106) of the program. For example, each user is provided with a unique version of the program. For example, different code fragments may be inserted in different versions (illustrated in the figure as a and c in versions 102 and 104), or the location where the code fragments are inserted may differ (illustrated by the different position 118 of a in version 106 compared to the a in version 102). As a user 112 is only provided with version 106 of the program, he can only access content that is not prevented by the code fragments in his version of the program. The content provider may deliver all content to all users, or may deliver each user only the content he is allowed to access.

In an embodiment, program upgrades are provided to the user when his permissions change. For example, code fragment 118 could be replaced by a different code fragment e to allow access to a new title of content. The software upgrade specifically changes the code fragment inserted in the relevant user's version 106 of the program. Therefore, the software upgrade may not be used to allow access to the content by means of another version 102, 104 of the program. This is particularly so if each user is provided with a unique version of the program.

In an embodiment, a lot of code fragments are inserted into the software program that is used for accessing the data. The inserted code fragment have a functionality that depends on the value of different data characteristics, such as, for instance, a checksum or hash-value. More precisely, such a code fragment enforces the software program to work properly for some values of the data characteristic and to work incorrectly for the others, where working incorrectly means that the program is either aborted or operates with reduced functionality or functionality that is undesirable from the point of view of the pirate. Metaphorically, the insertion of the code fragments can be viewed as inserting a lot of switches in a railway network, where a correct program execution corresponds to a specific route in this network. The position of a switch depends on the value of a characteristic and only one setting of the switches leads to a proper route. For each user the insertion of code fragments is done in a unique way. This does not mean that also each individual code fragment is unique. Only the collection of code fragments and the positions where they are inserted is unique for each user. Now, if a user wants to access data, either encrypted or not, then this can only be done by the program if the characteristics of the data imply that the inserted code fragments lead to correct functionality of the program, i.e., if the switches of the railway network are set properly.

In an embodiment, a user also is supplied with a program update that corrects all code fragments that, for a specific dataset or data stream, lead to an incorrect functioning of the program. The program update can be viewed as a key that is required to obtain the correct control flow in the software program for the given data. This way, the user is granted access to the dataset or data stream, without having to supply the user with a complete version of the program.

This method protects against piracy in the following sense. Suppose that a pirate wants to copy data and wants to sell it illegally to user A. As for user A other code fragments were inserted in the program for accessing the data than for the pirate, the program update of the pirate cannot be used by user A to access the copied data. The only way that the pirate can give user A the opportunity to access the data, is by providing user A also with his complete copy of the software program required for accessing the data. In many cases, this will be enough hindrance for user A to buy the illegal copy from the pirate. And if this is not the case, the unique set of code fragments inserted in the pirate's copy of the software program can be used to trace the pirate. This means that adequate measurements can be taken, such as refusing him access to future data. The tracing can be done highly effectively if the code fragments are inserted in the program in a unique way for each user. Hence, from a copy of the software program it can be decided who distributed it, i.e., who is the pirate. In addition to the inserted code fragments, other personalizing techniques can be used to trace back the user who distributed an illegal copy.

In an embodiment, the control flow of a program is made dependent of the data that is given as input to the program. Furthermore, this dependency is different for each user, i.e., for different users the same data leads to a different functionality (control flow) of the program. To use the program, legally acquired data may have to be accompanied with a software update that changes the dependency in such a way that a correct functionality (control flow) of the program is obtained for that data.

A relatively simple embodiment is described in the following. Suppose that a user A has a program P for watching copyrighted movies and suppose that the user wants to watch movie H. Consider the data characteristic 'checksum': all k-bit values of the first n bits of the data stream are added. A large number of if-statements can be inserted into program P. Each if-statement is given by 'if checksum=v then abort else skip', where value v is chosen randomly for each if-statement. The collection of if-statements and where they are placed is different for each user. The collection is chosen large enough, such that for each possible value of the checksum there are a number of if-statements in the program.

If user A now wants to watch movie H with checksum x, then this is not possible because program P will abort on the if-statement 'if checksum=x then abort else skip'. Therefore, the content provider provides user A with a program update that replaces all if-statements that abort on 'checksum=x' by if-statements that abort on some other checksum value. After installing the program update, user A can watch movie H. Another user B, however, cannot use the program update to watch movie H, because user B has a software program with different if-statements, or if-statements at different positions in the code. Furthermore, by inspecting the if-statements, the content provider can identify the owner of a software program, such that user A can be traced if he provides user B with his complete software program P.

This relatively simple embodiment is described here mainly for explanation purposes. In practice, the inserted code fragments may be less uniform, more elaborate, and obfuscated into the program. Many different characteristics of the data and combinations of them (via Boolean expressions) may be used simultaneously. Furthermore, instead of aborting the program, it may be better to let that the program operate with reduced or incorrect functionality. This may make it more difficult for the pirate to remove the dependency and may make the method more acceptable to a user who unknowingly attempts to use illegally distributed data. Obfuscation techniques may be used to hide the inserted code fragments in the software program. It is also noted that the program update given to a user can also insert new code fragments, remove code fragments, fix bugs, or repair breaks in the copy protection mechanisms. An example alternative for a checksum is a decryption key. The code fragments may manipulate the decryption key differently for different users, such that different users need a different decryption key to decrypt the same content item. An example of a manipulation of the key is performing an XOR operation with a predefined value. That predefined value may be chosen differently for different users, for example using a pseudo-random algorithm.

Figure 2:
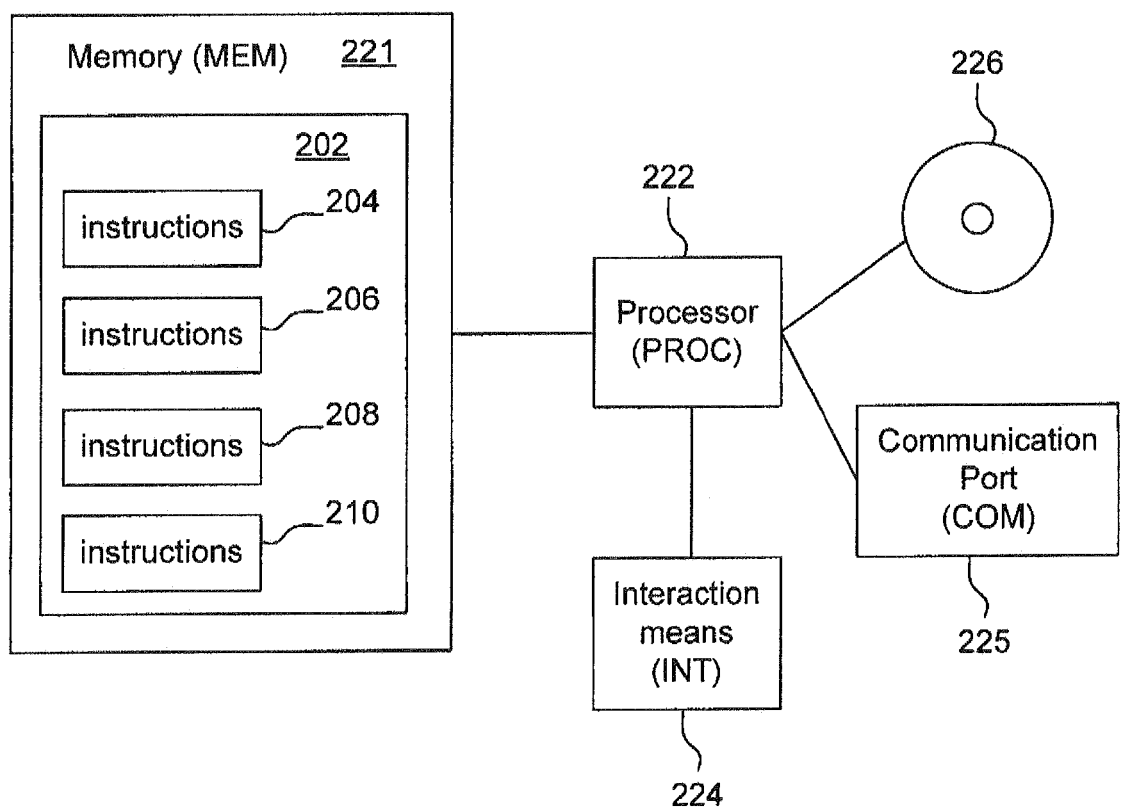
FIG. 2 is a diagram of an embodiment of the invention.

FIG. 2 illustrates an embodiment of the invention. The Figure shows a system, for example a server, with a processor 222 and memory 221. The memory 221 contains instructions for causing the processor to perform the method set forth. In particular, it contains instructions 202 for generating a plurality of versions of the program. Among these instructions 202 are instructions 204-210. Instructions 204 are for identifying one or more data characteristics of a content item for which a permission has been granted. These content items may also be identified by identifying the content items for which permission has not been granted. Memory 221 also stores instructions 206 for determining a plurality of code fragments for causing a processor to perform a test regarding the data characteristic, and instructions 208 for associating each respective code fragment with a respective location in the program. Memory 221 also stores instructions 210 for incorporating the respective code fragments into the program at the respective associated locations. It will be understood that one or more of the blocks 202-210 may be implemented as hardware components or separate devices or servers, for example under control of processor 222. The system also has access to mass storage medium 226 for accessing digital content. The Figure also shows communication port 225 for providing the versions of the program and the content to the users via a network such as a TCP/IP or Wifi network or other connection. The interaction means 224 can comprise a computer mouse, keyboard, and/or monitor for allowing a user to operate the system. Such mass media 226, communications port 225, and interaction means 224 are known in the art.

The method has been described above mainly for the case that each user obtains a user specific version of the program according to user permissions. The permissions can also be associated directly with the versions of the program. In principle, the same version can be provided to a group of users. Also, several versions may be provided to a single user. The restrictions on the processing of content items are (at least in part) determined by code fragments in the version of the program.

It is also possible that the permissions not only specify a simple yes/no, but specify in more detail what may be done with the content item. For example, it may specify that the item may be used for a predetermined time duration, may be rendered a predetermined number of times, may be rendered for only a predetermined portion thereof, or may be rendered only with a limited quality or in low-definition. The code fragments may be used to enforce these restrictions as specified by the permissions. Changes in these permissions may be realized by providing an appropriate upgrade for applying a change to at least one code fragment of the plurality of code fragments and/or its associated location. The change to the code fragment causes the restriction on the processing of the particular content item to be changed according to the change in the permission.

In an embodiment, at least one of the code fragments incorporated in the program is arranged for causing a processor to compare a value derived from the content to a reference value as part of the test. The reference value may be hard-coded in the code fragment, or it may be stored in a separate file. The reference value may be a checksum or for example a hash code. To make unique versions of the program, the checksum may be computed differently for different users. This way, each user would need a different file with a different reference value. Upon the user being granted permission for a further content item, a further reference value is identified in dependence on the further content item. For example, the checksum value is computed for that content item. The code fragment is arranged for causing the processor to compare the value derived from the content to the further reference value as part of the test. For example, a file is provided to the user to replace or to extend the existing file by replacing the existing reference value with the further reference value, or by adding the further reference value to the existing reference value. As the code fragment uses the reference value(s) in the file, replacing or extending the file with the new reference values would be sufficient to arrange the code fragment to use the further reference value in the test.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of controlling distribution of digital content, comprising:
   generating a plurality of versions of a program, each version being unique with respect to incorporated code fragments and/or associated locations thereof, said generating comprising, for each version, the steps of:
   identifying one or more data characteristics of a content item for which a permission has been granted;
   determining a plurality of respective code fragments, each respective code fragment, when executed by a processor, causing a processor to perform a respective test regarding at least one of the data characteristics on content to be processed by the program for restricting the processing of content for which the permission has not been granted;
   associating each respective code fragment with a respective location in the program; and
   incorporating the respective code fragments into the program at the respective associated locations to obtain the respective version of the program.

2. The method according to claim 1, further comprising, upon permission being granted for a further content item, generating an upgrade for applying a change to at least one code fragment of the plurality of code fragments and/or its associated location, to avoid the processing of the further content item to be restricted.

3. The method according to claim 1, further comprising, upon permission being withdrawn for a particular content item, generating an upgrade for applying a change to at least one code fragment of the plurality of code fragments and/or its associated location, to cause the processing of the particular content item to be restricted.

4. The method according to claim 1, further comprising identifying one or more data characteristics of a particular content item for which a partial permission has been granted; and determining the plurality of respective code fragments such that the processing of the particular content item is restricted according to the partial permission.

5. The method according to claim 4, further comprising, upon the partial permission being changed, generating an upgrade for applying a change to at least one code fragment of the plurality of code fragments and/or its associated location, to cause the restriction on the processing of the particular content item to be changed according to the change in the permission.

6. The method according to claim 1, further comprising for the version of the program
   granting permission to a user associated with the version; and
   providing the version of the program only to the user associated with the version.

7. The method according to claim 1, further comprising for the version of the program
   granting permission to a user associated with the version; and
   providing the content item for which permission has been granted to the user.

8. The method according to claim 2, further comprising including in the upgrade instructions for providing additional functionality or for fixing a bug in the program.

9. The method according to claim 1, further comprising
   arranging the version of the program to have an input for reading a reference value; and
   arranging at least one code fragment of the plurality of code fragments for causing a processor to compare a value derived from the content to the reference value as part of the test.

10. The method according to claim 9, further comprising, upon the user being granted permission for a further content item,
   identifying a further reference value in dependence on the further content item; and
   providing the further reference value to the input, thereby causing the processor to compare the value derived from the content to the further reference value as part of the test.

11. A system for controlling distribution of digital content, said system comprising:
   a processor;
   a storage medium coupled to the processor;
   a communications port coupled to the processor;
   a memory coupled to the processor, the memory storing instructions, which when executed by the processor, cause the processor to perform:
      generating a plurality of versions of the program, each version being unique with respect to incorporated code fragments and/or associated locations thereof, the generating a plurality of versions of the program comprising, for each version:
      identifying one or more data characteristics of a content item for which a permission has been granted;
      determining a plurality of respective code fragments, each respective code fragment, when executed by a second processor, causing the second processor to perform a respective test regarding at least one of the data characteristics on content to be processed by the program for restricting the processing of content for which the permission has not been granted;
      associating each respective code fragment with a respective location in the program; and
      incorporating the respective code fragments into the program at the respective associated locations to obtain the respective version of the program.

12. A non-transitory computer readable storage medium storing executable instructions, which when executed by a computer processor, cause the computer processor to perform a method comprising:
   generating a plurality of versions of a program, each version being unique with respect to incorporated code fragments and/or associated locations thereof, said generating a plurality of versions of the program comprising, for each version:
   identifying one or more data characteristics of a content item for which a permission has been granted;
   determining a plurality of respective code fragments, each respective code fragment, when executed by a processor, causing the processor to perform a respective test regarding at least one of the data characteristics on content to be processed by the program for restricting the processing of content for which the permission has not been granted;
   associating each respective code fragment with a respective location in the program; and
   incorporating the respective code fragments into the program at the respective associated locations to obtain the respective version of the program.

* * * * *